US006170216B1

(12) United States Patent
Rye et al.

(10) Patent No.: US 6,170,216 B1
(45) Date of Patent: Jan. 9, 2001

(54) GRID STRUCTURE

(75) Inventors: Palle Rye, Reading; Timothy Krell, Fleetwood; Curtis McDowell, Allentown; Richard Aull, Reading, all of PA (US)

(73) Assignee: Brentwood Industries, Inc., Reading, PA (US)

(*) Notice: Under 35 U.S.C. 154(b), the term of this patent shall be extended for 0 days.

(21) Appl. No.: 09/268,517

(22) Filed: Mar. 12, 1999

(51) Int. Cl.[7] .................................................. E04C 2/42
(52) U.S. Cl. ................... 52/660; 52/662; 52/663; 52/664; 52/666; 52/656.8
(58) Field of Search ............................. 52/660, 662, 663, 52/664, 666, 656.8, 775, 763, 762

(56) References Cited

U.S. PATENT DOCUMENTS

| 3,886,706 | * | 6/1975 | Baker | 52/793.11 |
| 4,996,008 | | 2/1991 | Peterson. | |
| 5,661,944 | * | 9/1997 | Specht | 52/656.8 |
| 5,676,894 | * | 10/1997 | Specht | 264/46.4 |
| 5,901,524 | * | 5/1999 | Wright | 52/668 |

OTHER PUBLICATIONS

"Biograte™ for trickling filter media protection" (Cover Page) with attached Biograte CF–1900 Product Drawing No. CTP–0139, Brentwood Industries, Inc. company flyer, handwritten p. Nos. G–1 and G1(a) (Dec. 13, 1995).
"Trickling Filter Walkway Grating," Marley Cooling Tower Company single–page flyer (1998).
Blueprint No. D–612–1111 D—Polygrid Shape #11, Ecodyne Cooling Tower Services, 1 page (1990); and "Multigrid® Grating," 1–page, CSI (1998).

* cited by examiner

Primary Examiner—Christopher T. Kent
Assistant Examiner—Jennifer I. Thissell
(74) Attorney, Agent, or Firm—Akin, Gump, Strauss, Hauer & Feld, L.L.P.

(57) ABSTRACT

A grid structure capable of withstanding a compressive force comprises a peripheral frame, a plurality of first grid members connected to and extending within the peripheral frame and a plurality of second grid members connected to and extending within the peripheral frame. The second grid members intersect the first grid members. The first and second grid members form a grid of small frames disposed within the peripheral frame. The grid has an upper surface and a lower surface wherein a first group of at least a portion of at least one of the first and second grid members have flanges on the upper surface, the flanges being generally perpendicular to the first and second grid members and a second group of at least a portion of at least one of the first and second grid members have flanges on the lower surface, the flanges being generally perpendicular to the first and second grid members. A process of making the grid structure is also disclosed, as is an assembly of such grid structures.

26 Claims, 5 Drawing Sheets

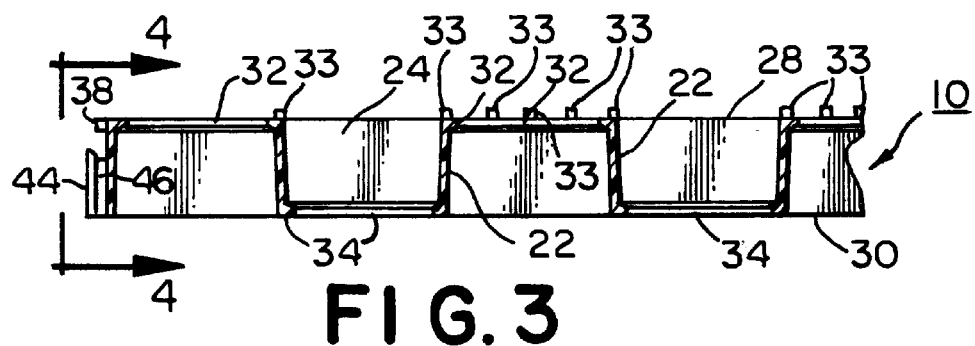
FIG. 3
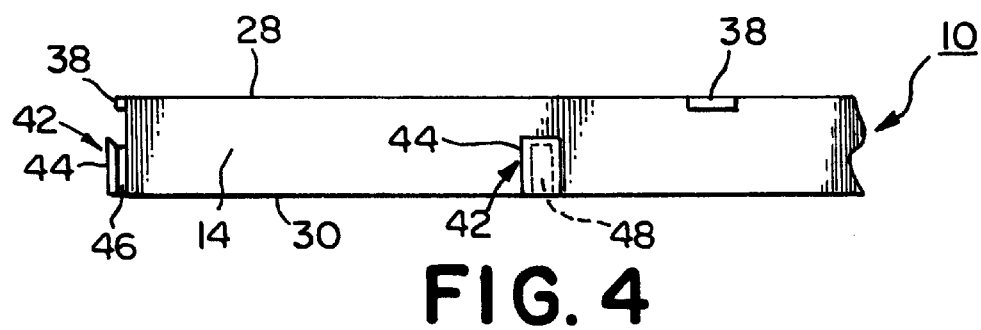
FIG. 4
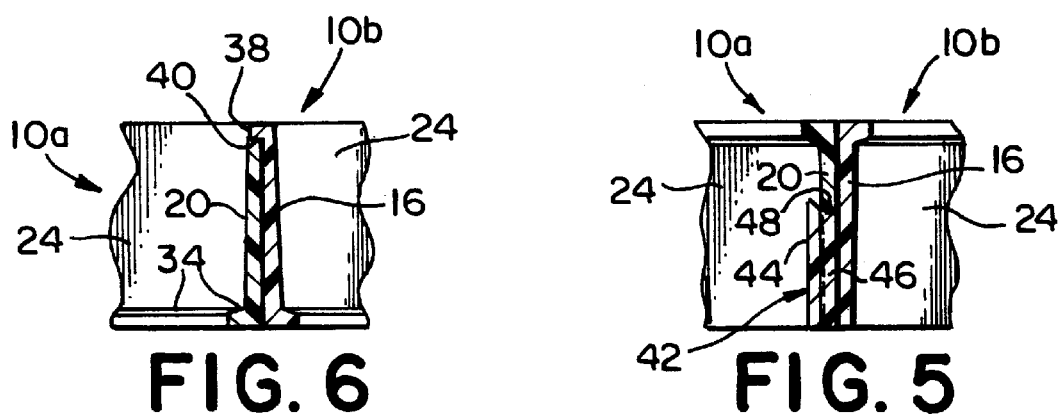
FIG. 6
FIG. 5

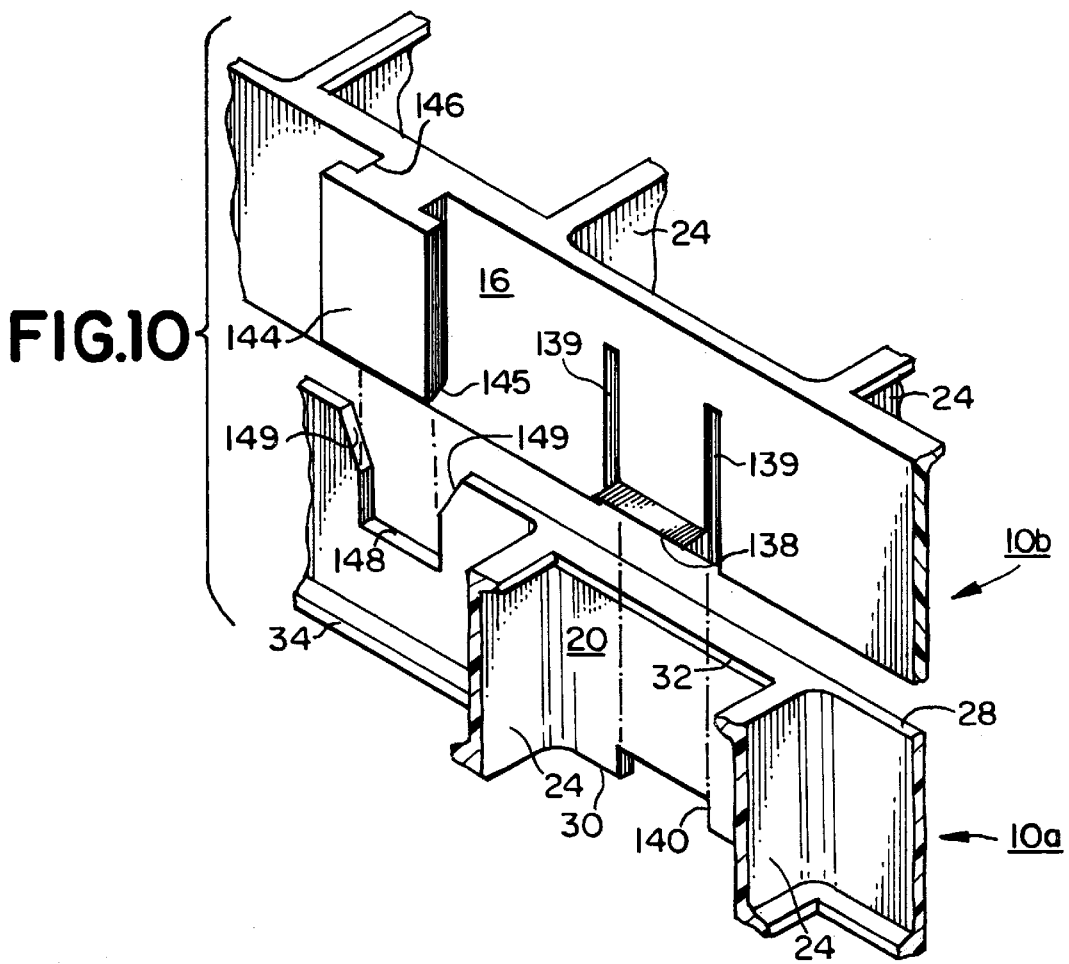
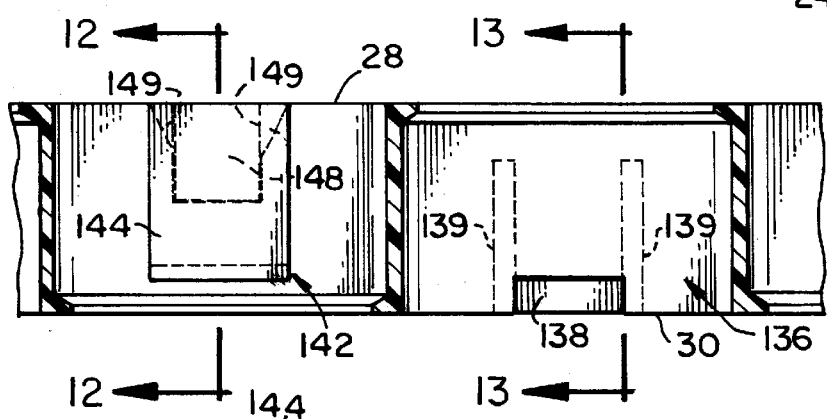
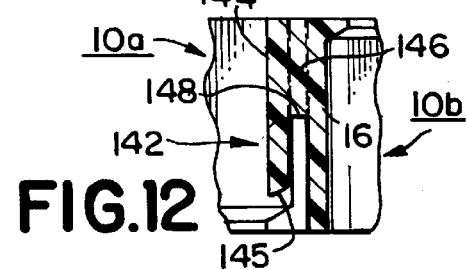 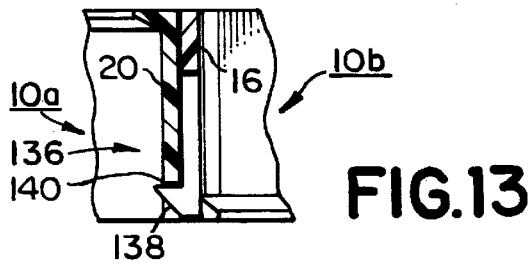

GRID STRUCTURE

BACKGROUND OF THE INVENTION

The present invention relates to a structure in the form of a grid or grate (hereinafter "grid") and, more particularly, a grid structure for disposition over trickling filter systems, large air conditioning systems, or heat exchange systems, such as in cooling towers, to provide a platform for a person to walk on without the platform or underlying support media collapsing under the weight of the person.

Trickling filters and cooling tower heat exchange systems typically are structures having a large footprint such that components within the systems cannot be reached from the sides. Therefore, it is necessary for replacement, maintenance or repair for a person or persons to have some structure which allows workers to reach the center of the systems. Sometimes, permanent catwalks are built, but these are expensive and must be custom designed for each installation. Therefore, this solution has not been desirable.

These types of systems typically include a housing in which are located a large number of thin plastic plates aligned in a parallel relationship. In trickling filters, the plates act as support for desired bacteria which form biological filters for water or other liquid flowing through the plates. In air conditioning or other heat exchange systems, the plates act as gas-liquid contact bodies to provide for evaporative heat exchange. The plates are referred to in these industries as "media". The plates are rather thin, on the order of a couple of millimeters or less, and typically have their upper edges exposed to the environment. If a worker were to walk on top of the plates, it is likely that the upper edges of the plates would become broken or bent, which adversely affects the performance of the trickling filter, heat exchanger or other equipment.

Grids forming walking platforms for trickling filters, air conditioning and other air handling systems are known. The grids are in the form of plastic structures which can be placed on top of the media and are intended to distribute the weight of a worker or workers over many of the media plates so that the upper edges of the media are not harmed. Some of the grids presently used have a structure including horizontal flanges extending only along the top surface where the horizontal flanges provide some structural integrity and greater surface area than if such flanges were not used. However, such present injection molded grid structures do not have horizontal flanges on portions of both their upper and lower surfaces, and therefore, the non-flanged surface results in such grids having less structural integrity and have the potential of being crushed under the weight of the person walking on top of them. Due to the molding or thermoforming techniques used to make the present grid structures, horizontal flanges cannot practically be formed on both the lower and upper surfaces and, if increased structural integrity is desired, the grid has to be made using thicker walls. This, of course, requires more material to be used, increasing the cost and weight of the grid.

There is a need for a grid to have the sufficient strength to withstand a compressive force equivalent to the weight of a maintenance person without destroying the integrity of the grid itself, while also providing a safe and comfortable walking surface. The present invention satisfies this need.

In addition to a primary use of the grid structure of the present invention as a platform for performing maintenance, repair and replacement in trickling filters and heat exchange systems, when the grid structure of the present invention is laid upon the top of the media in such systems, the grid acts to shade the media and reduce the degradative effects of UV light. The grid also acts to protect the upper surface of the media from the effects of environment such as hail and heavy rain by acting as a type of deflector shield or splash guard. This is particularly helpful in the case of trickling filters, where heavy rain can wash away part of the biological layer formed on the media. The grid also protects the biological layer in trickling filters and the media in trickling filters and evaporative heat exchanges from the impact and erosive effects of the hydraulic force generated by the liquid distribution system, such as nozzles, a distributor arm, or the like.

The molding techniques of the present invention make it practical to form the grid structure having flanges on opposite surfaces as discussed hereinafter.

BRIEF SUMMARY OF THE INVENTION

A first aspect of the present invention comprises a grid structure capable of withstanding a compressive force comprising a peripheral frame, a plurality of first grid members connected to and extending within the peripheral frame, a plurality of second grid members connected to and extending within the peripheral frame, the second grid members intersecting the first grid members, wherein the first and second grid members form a grid of small frames disposed within the peripheral frame, the grid having an upper surface and a lower surface and wherein a first group of at least a portion of at least one of the first and second grid members have flanges on the upper surface, the flanges being generally perpendicular to the first and second grid members and a second group of at least a portion of at least one of the first and second grid members have flanges on the lower surface, the flanges being generally perpendicular to the first and second grid members.

A second aspect of the present invention relates to a process of making a grid structure capable of withstanding a compressive force comprising (a) forming a first mold section and a second mold section, the first and second mold sections together including a plurality of cavities adapted to form a grid structure comprising a peripheral frame, a plurality of first grid members unitarily formed with and extending within the peripheral frame, a plurality of second grid members unitarily formed with and extending within the peripheral frame, the second grid members intersecting the first grid members, wherein the first and second grid members form a grid of small frames disposed within the peripheral frame, the grid having a first surface and a second surface and wherein the first mold section has a shape that is adapted to form flanges on the first surface of a first group of at least a portion of at least one of the first and second grid members, the flanges being generally perpendicular to the first and second grid members, and wherein the second mold section has a shape that is adapted to form flanges on the second surface of the second group of at least a portion of at least one of the first and second grid members, the flanges being generally perpendicular to the first and second grid members; (b) bringing together and aligning the two mold sections; (c) injecting into the cavities of the first and second mold sections a liquid material selected from the group consisting of a molten plastic material and a curable plastic material; (d) allowing the liquid material to solidify or cure in the mold to form a solid grid structure; (e) separating the mold sections; and (f) removing the solid grid structure.

Another aspect of the present invention relates to a grid assembly comprising a plurality of grid structures as set forth herein.

BRIEF DESCRIPTION OF THE SEVERAL VIEWS OF THE DRAWINGS

The foregoing summary, as well as the following detailed description of preferred embodiments of the invention will be better understood when read in conjunction with the appended drawings. For the purpose of illustrating the invention, there are shown in the drawings, embodiments which are presently preferred. It should be understood, however, that the invention is not limited to the precise arrangements and instrumentalities shown. In the drawings:

FIG. 3 is a cross-sectional view of the grid shown in FIG. 1 taken along line 3—3 of FIG. 1;

FIG. 4 is a side view of the grid shown in FIG. 3 taken along line 4—4 of FIG. 3;

FIG. 5 is an enlarged cross-sectional view of the connected grids shown in FIG. 2 taken along line 5—5 of FIG. 2;

FIG. 6 is an enlarged cross-sectional view of the connected grids shown in FIG. 2 taken along line 6—6 of FIG. 2;

FIG. 10 is an exploded, partial perspective and cross-sectional view of portions of two adjacent grid structures showing their interconnection using presently more preferred attachment elements;

FIG. 11 is a partial front and cross-sectional view of portions of the interconnected grid structures shown in FIG. 10;

FIG. 12 is a partial cross-sectional view of the interconnected grid structures taken along line 12—12 of FIG. 11; and FIG. 13 is a partial cross-sectional view of the interconnected grid structures taken along line 13—13 of FIG. 11.

DETAILED DESCRIPTION OF THE INVENTION

Figure 1:
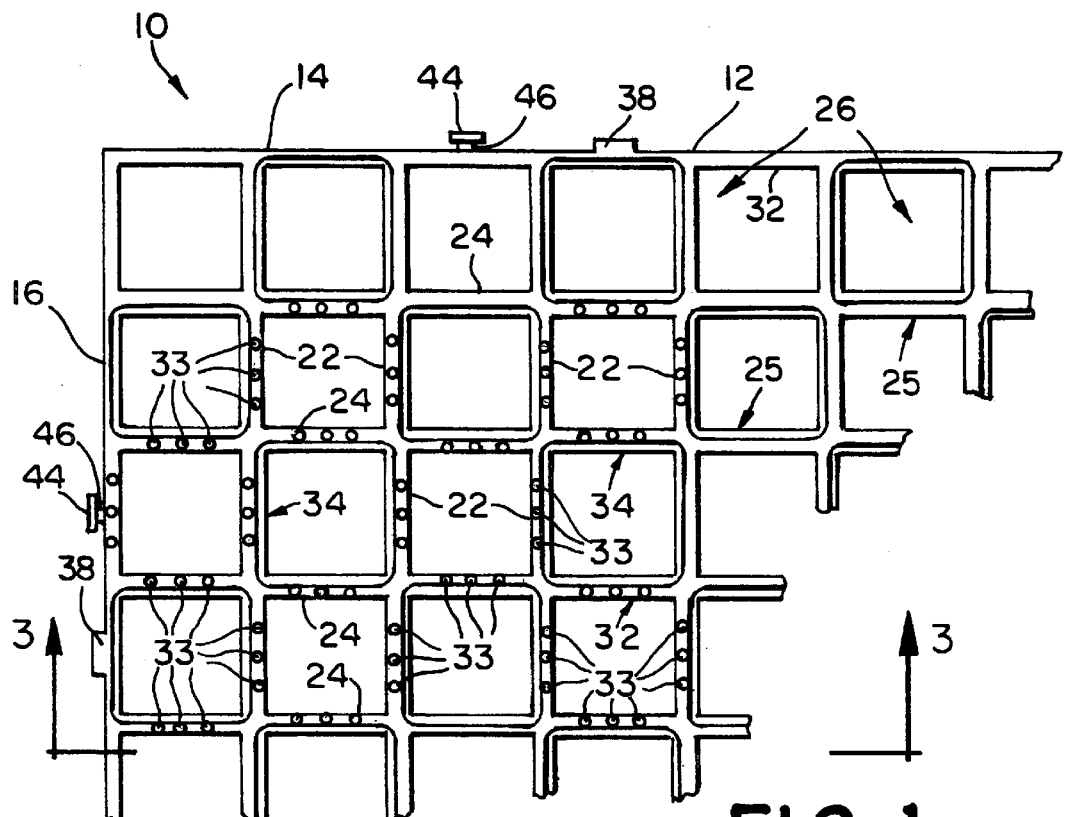
FIG. 1 is a top plan view of a portion of the grid according to the present invention.

Certain terminology is used in the following description for convenience only and is not limiting. The words "lower," "upper," "left," and "right" designate directions in the drawings to which reference is made. The words "inner" and "outer" refer, respectively, to directions toward and away from, respectively the center of the grid structure and designated parts thereof. The words "vertical" and "horizontal" refer to the orientation in which the grid structure of the present invention is primarily intended to be used, namely, when the grid is lying flat on a generally horizontal surface, as in the orientation of FIGS. 3 and 4. The terminology includes the words above specifically mentioned, derivatives thereof and words of similar import.

Figure 7:
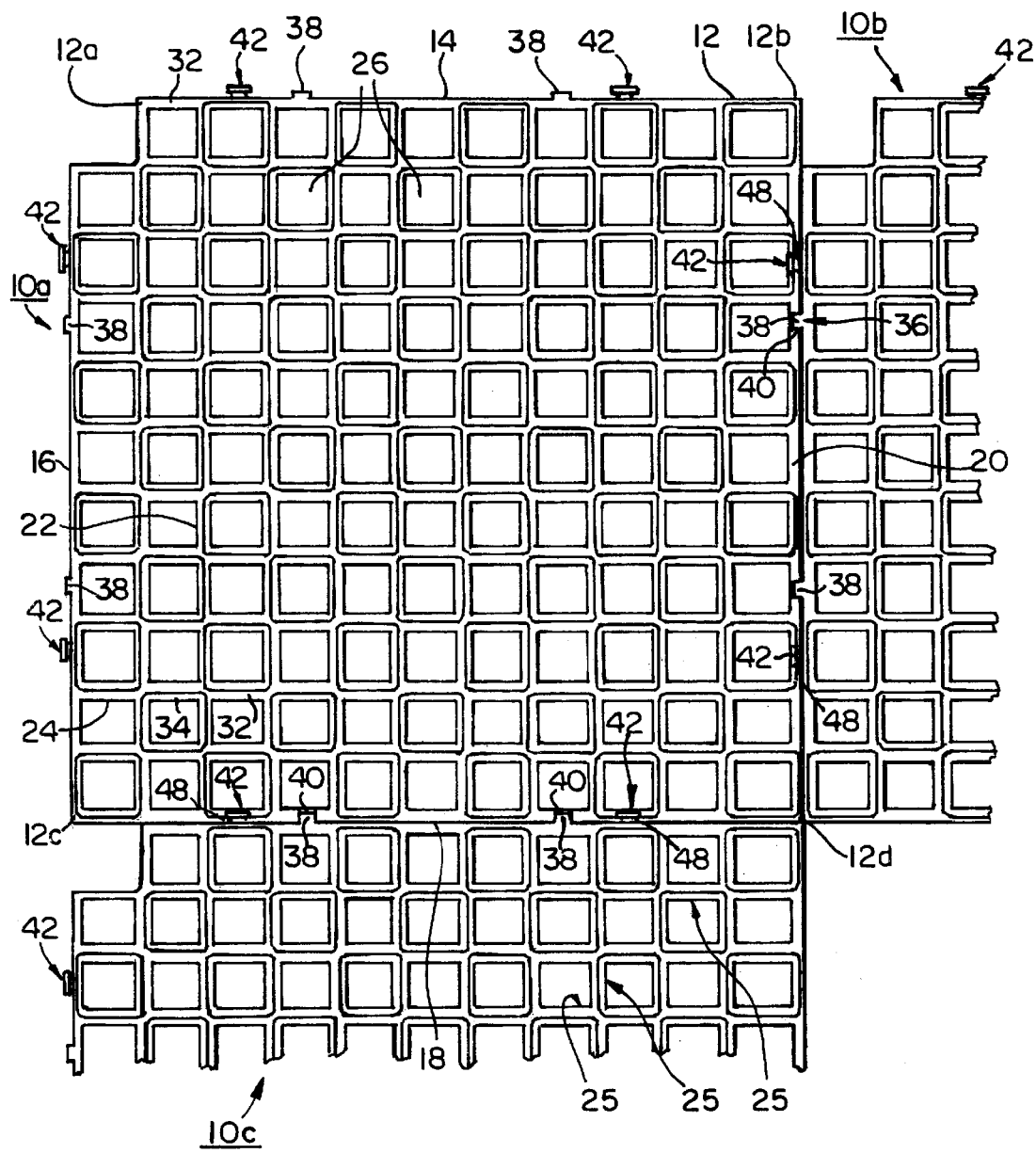
FIG. 7 is a top plan view, partially broken away, of a grid assembly formed from a plurality of grids of the present invention attached to each other.

Referring now to the drawings in detail, wherein like numerals are used to indicate like elements throughout the several views, there is shown in FIGS. 1 through 7 a preferred embodiment of a grid structure, generally designated 10, in accordance with the present invention. Referring to FIG. 1 showing a portion of one grid 10, and to FIG. 7 showing three interconnected grids 10a, 10b and 10c (or portions thereof, wherein each of grids 10a, 10b and 10c has the structure of grid 10), the grid 10 includes a peripheral frame 12 forming the peripheral walls of the grid 10, including a first wall 14, a second wall 16, a third wall 18, and a fourth wall 20. It would be understood by those of ordinary skill in the art in view of this disclosure that frame 12 may include more walls than the four shown in the drawings or less than the four walls shown and that the frame 12 may include other polygon shapes including but not limited to triangular, hexagonal, and other shapes, including circles, ovals and any other regular or irregular shapes for any particular application. For convenience and ease in understanding, the invention is described in terms of the rectangular-shaped frame shown, more particularly, a square shape.

Referring to FIG. 1, the first wall 14 is joined by the second wall 16 at the upper left corner 12a of the Figure, and as shown in FIG. 7, the first wall 14 is also joined to the fourth wall 20 at its upper right corner 12b. Likewise, and as also shown in FIG. 7, the third wall 18 is joined by the second wall 16 and fourth wall 20 at its lower left and right corners 12c, 12d, respectively. Preferably, the first wall 14 is generally parallel to the third wall 18 and the second wall 16 is generally parallel to the fourth wall 20. Likewise, in the exemplary embodiment shown, the corners 12a, b, c and d are all at generally 90° angles to form a rectangular shaped frame, in the form of a square.

FIG. 7 shows a presently preferred embodiment where one corner of the grid 10, exemplified by corner 12a, is truncated in both walls 14 and 16 to form an indented corner. This is a preferred embodiment to help workers more quickly orient each grid when a grid assembly is formed from several grid structures 10a, 10b, 10c and so on, as shown in FIG. 7. If the grids are oriented so that the notched corner is always in the upper left corner, for example, then the attachment elements described hereinafter will always be aligned for more efficient interconnection of the individual grids to form a grid assembly. One skilled in the art in view of this disclosure would appreciate that the notched corner could be located at any of the other corners instead of the upper left corner as shown in FIG. 7. Even with the notched corners, the shape of the grid stuctures 10a, 10b and 10c as shown in FIG. 7 is considered to be rectangular, and more specifically square, within the meaning of this disclosure.

Disposed within the frame 12 are a plurality of first grid members 22 (see FIGS. 1, 3 and 7) that extend generally vertically between an upper surface 28 and lower surface 30 of the grid (when the grid is lying flat on a generally horizontal surface in the orientation of FIG. 3) and transversely between the first wall 14 and opposing third wall 18. The first grid members 22 are connected to the walls 14 and 18, preferably by being formed with the walls as a unitary structure, as by the molding process discussed below. It is preferable that the first grid members 22 extend generally parallel to each other and to peripheral walls 16 and 20. However, it would be understood by those of ordinary skill in the art in view of this disclosure that the present invention is not limited to the first grid members 22 being generally parallel to each other or to the frame walls 16 and 20. Thus, the plurality of vertical members 22 may be disposed within the frame at different angles or even curved, but extending between walls 14 and 18 within the frame 12. The first grid members 22 may be disposed within the frame, parallel to one another but disposed within the frame 12 so that they are not parallel to the peripheral walls 16, 20 of frame 12. All of these alternative arrangements may be made without departing from the spirt and the scope of the invention.

A plurality of second grid members 24 are likewise disposed within the frame 12 generally vertically (again with respect to the orientation when the grid is lying flat as in FIG. 3) like the first grid members 22, and extending transversely between the opposed second and fourth walls 16, 20. The second grid members 24 are connected to the walls 16 and 20, preferably by being formed with the walls and with the first grid members 22 as a unitary structure, as by the molding process discussed below. The plurality of members 24 are preferably generally parallel to one another but also may be disposed in a non-parallel configuration, as described above regarding the first grid members 22, without departing from the scope and spirit of the invention. Likewise, and as shown in FIGS. 1 and 7, the second grid members 24 are shown to be generally parallel to peripheral walls 14, 18 of the frame 12. It is within the scope and spirit of the invention that the second grid members 24 may be disposed within the frame 12 so that either none or only some of the members 24 are generally parallel to the walls 14, 18 of frame 12.

The direction and orientation of the first and second grid members 22 and 24 are described herein as extending "generally vertically" between the upper surface 28 and the lower surface 30 of the grid, since there should be a slight angle, on the order of up to about 2°, so that the grid structure can be released from the mold during the molding process described below.

Taken as a unit, grid structure 10 is comprised of the frame 12 including peripheral walls 14, 16, 18, and 20, and first grid members 22 and second grid members 24 that form a grid of small frames 25 defining openings 26 disposed within the frame 12. As used herein, the term "small frames" means the frames within the peripheral frame 12 formed by the intersection of the grid members 22 and 24 with each other and/or with the walls of the peripheral frame 12. In the embodiment shown in FIGS. 1 through 7, the small frames 25 form openings 26 that are generally square in shape (best seen in FIGS. 1, 2 and 7), since they are formed by the evenly spaced first and the second grid members 22 and 24 intersecting or joining each other at right angles. However, it is within the scope and spirit of this invention that the small frames 25 may define openings 26 of any general shape created by the intersection of the first grid members 22, second grid members 24 and peripheral walls 14, 16, 18, 20 of frame 12.

The grid structure 10 formed by frame 12 and the intersecting grid members 22 and 24 also has an upper or first surface 28 and a lower or second surface 30, as noted best in FIGS. 3 and 4. The terms "first surface" and "second surface" as used herein relate to the process of making the grid structure. This is because the respective terms "upper surface" and "lower surface" used synonymously herein otherwise may be considered confusing in the context of a molding process where the mold may not be configured horizontally.

One presently preferred square grid embodiment generally has peripheral walls and first and second grid members each about 24 inches (about 610 mm) in length and about 1.25 inches (about 31 mm) in height. Also in the preferred square embodiment, the first grid members 22 are separated by approximately two inches (about 51 mm) from each other as well as from the second wall 16 and the fourth wall 20 of the frame 12. FIG. 7 shows that ten grid members 22, equally spaced apart, are positioned between the second wall 16 and the fourth wall 20. Likewise, ten second grid members 24 are disposed between the first wall 14 and third wall 18 generally having a space of approximately two inches (about 51 mm) between members 24 and the peripheral walls. The first and second grid members thus form small frames having square openings of about 2 inches by about 2 inches (about 51 mm by about 51 mm). It would be understood by those of ordinary skill in the art in view of this disclosure that the present invention is not limited to the specific dimensions of the frame 12 or number of components (members 22 and 24) of the grid and that other dimensions of the peripheral frame 12 as well as the number and spacing of the members 22 and 24 within the frame could be used without departing from the spirit and scope of the invention.

At least some portions of at least one of the first grid members 22 and the second grid members 22, and preferably, at least some portions of the peripheral walls comprising the peripheral frame 12 are provided on some of their upper and lower surfaces with reinforcing upper and lower flanges 32 and 34. Although only portions of the first grid members 22 or only portions of the second grid members 24 need have upper and lower flanges 32 and 34, preferably, at least some of each of the grid members 22 and 24 have upper flanges 32 and lower flanges 34 on at least some portions of their respective upper and lower surfaces. It is preferred that the reinforcing upper and lower flanges 32 and 34, respectively, extend from the upper and lower surfaces of some portions of the walls, 14, 16, 18, and 20 and from some of the first grid members 22 and second grid members 24, in a general perpendicular direction (that is, horizontally with respect to the flat orientation of the grid as shown in FIGS. 3–6). Referring to FIGS. 1, 2, 3 and 7, the reinforcing upper horizontal flanges 32 are provided to the upper surface 28 and the reinforcing lower horizontal flanges 34 are provided to the lower surface 30.

The upper flanges 32 and lower flanges 34 are formed in a sufficient portion of the peripheral walls and in a sufficient number of the first and/or second grid members 22 and 24 to provide the grid structure 10 with the desired structural rigidity for its intended purpose. When the grid structure is used as a platform support for supporting the weight of workers during maintenance and repair of trickling filters and evaporative heat exchangers, as discussed above, for example, it is preferred that the upper flanges 32 are formed on a first group of at least a portion of one of the first and second grid members, and more preferably, on a portion of both the first and second grid members, comprising about one-third to about one-half of the upper surface 28 of the grid, and that the lower flanges 34 are formed on a second group of at least a portion of at least one of the first and second grid members, and more preferably, on a portion of both the first and second grid members, comprising about one-third to about one-half of the lower surface 30 of the grid. It is more preferred that the upper surface flanges 32 on the first group of the first and second grid members comprise about one- half of the upper surface of the grid. Likewise, it is preferred that the lower surface flanges 34 formed on the second group of the first and second grid members comprise about one-half of the lower surface 30 of the grid.

It is even more preferred that the upper surface flanges 32 on the first group of grid members comprise flanges extending around and within the upper surface of about one-half of the grid members forming the small frames 25 in a first pattern and that the lower surface flanges 34 formed on the second group of grid members comprise flanges extending around and within the lower surface of about one-half of the grid members forming the small frames 25 in a second pattern. In this more preferred embodiment, the first and second patterns are arranged such that the small frames of the first group of the first pattern are adjacent to the small frames of the second group of the second pattern. This arrangement is best illustrated in FIGS. 1 and 7.

Figure 2:
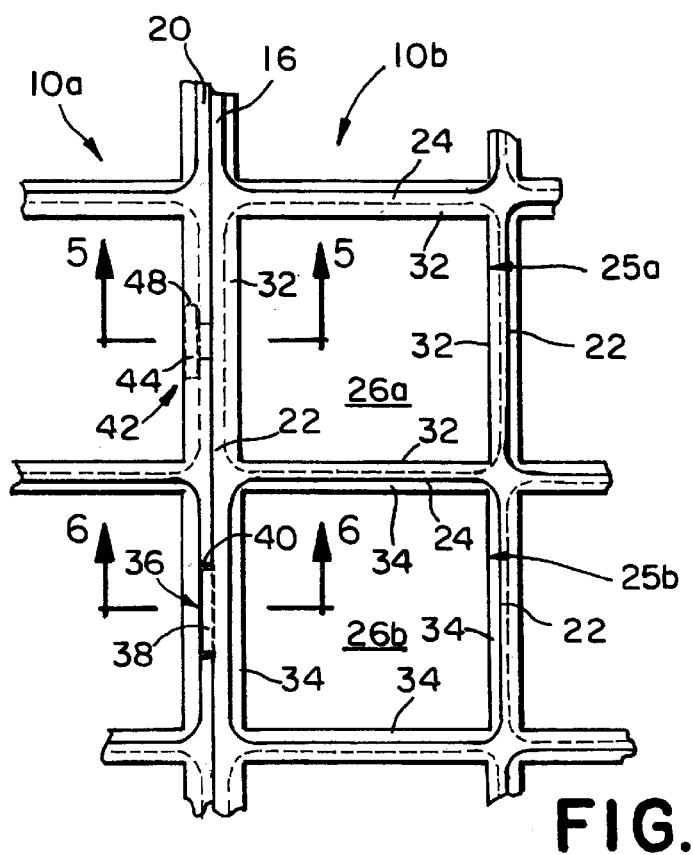
FIG. 2 is an enlarged plan view of a portion of the grid shown in FIG. 1 connected to a second grid according to the present invention.

To explain further, referring to FIGS. 1, 2, 3 and 7, in a preferred embodiment, an upper flange 32 extends inwardly from the upper surface 28 of grid members 22 and 24 that form the small frames 25 with openings 26. An enlarged detail is shown in FIG. 2. The sections of flange 32 are shown as the area between the dashed lines and bold lines of the small frame 25a and first and second grid members 22 and 24 outlining the periphery of opening 26a. Likewise, the small frame 25 shown in the lower right corner of FIG. 2 includes a lower reinforcing horizontal flange 34 disposed about the lower surface 30 of the grid 10b. The lower surface reinforcing flange 34 of the grid is depicted by the parallel bold lines extending from the grid members 22 and 24 forming the small frame 25b defining the opening 26b (also FIG. 2).

Referring to FIGS. 1 and 7, a checkerboard-type of pattern is formed in grid 10, wherein small frames 25 with upper reinforcing horizontal flanges 32 on the upper surface 28 alternate in both illustrated directions with small frames 25 having lower reinforcing horizontal flanges 34 located on the lower surface 30.

It would be understood by those of ordinary skill in the art in view of this disclosure that the present invention is not limited to constructing reinforcing horizontal flanges 32, 34 in each respective alternating small frame upper and lower surfaces and that other patterns such as alternating second or third frame patterns of reinforcing flanges could be created without departing from the spirit and scope of the invention. A satisfactory number of reinforcing flanges 32, 34 is required so that sufficient reinforcement strength is provided to the grid 10 to withstand any compressive forces anticipated to be applied to one or both of the upper or lower surfaces of the grid 10.

Figures 8, 9:
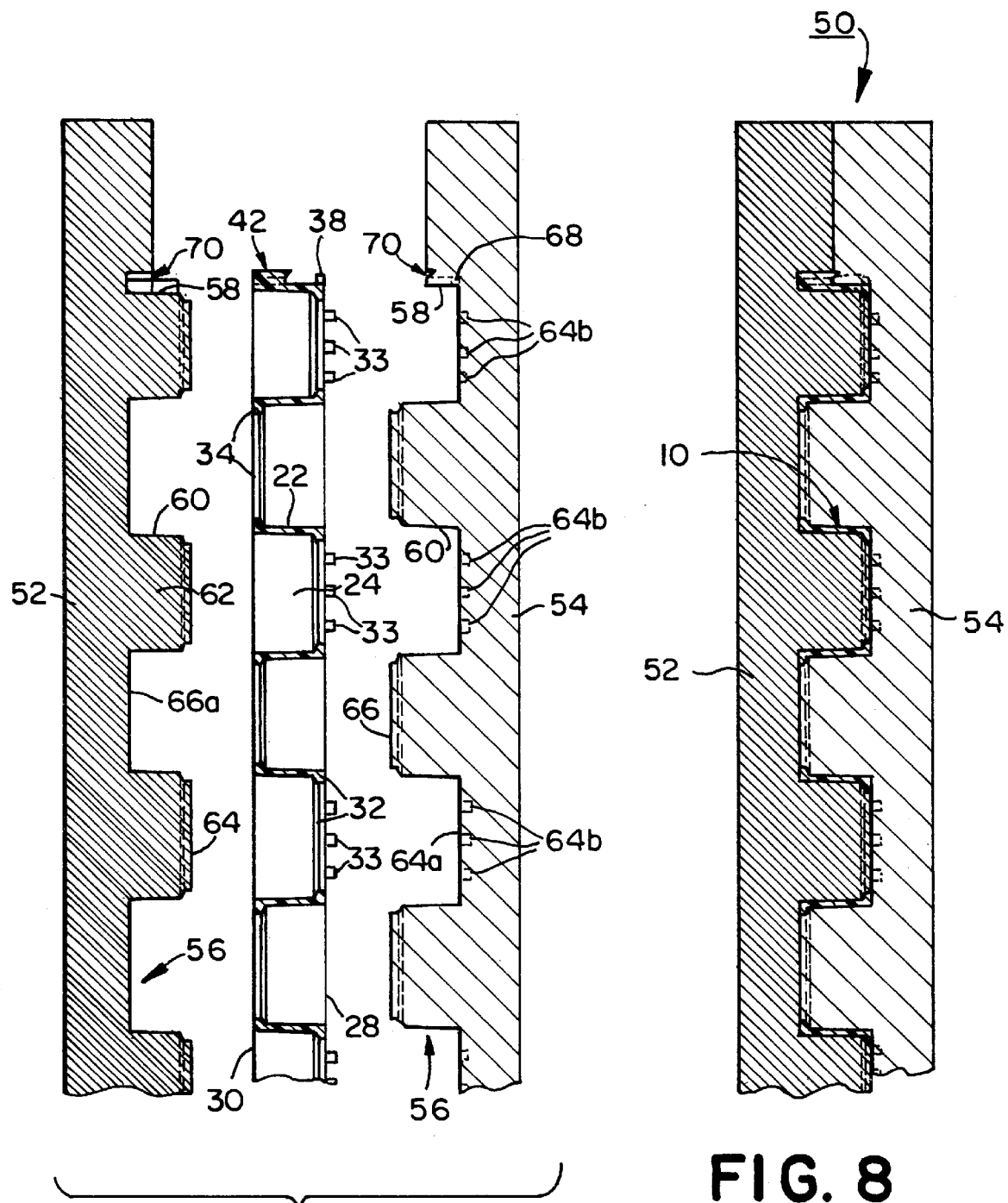
FIG. 8 is a schematic, partial cross-sectional view, of the mold used to make a preferred grid according to FIG. 1, where the mold is shown in the closed position, and including a grid being formed according to the present invention.
FIG. 9 is a schematic, partial cross-sectional view of the mold of FIG. 8 showing the mold sections separated and a grid formed according to the preferred process of the present invention.

When the grid structure 10 is used as a horizontal walking platform, it is presently preferred, but not essential, to form on the upper surface of at least some, if not substantially all of the upper flanges 32, a number of projections or nibs 33, best seen in some of the upper flanges 32 in FIGS. 1, 3 and 9. The nibs 33 are not shown on all of the upper flanges in all of the Figures for the sake of clarity. The combination of the upper flanges 32, which are wider than the peripheral walls or the first or second grid members 22 and 24, along with the nibs 33, provide a comfortable and safe walking surface for workers walking on the grids.

The flanges 32 and 34 and the nibs 33 are preferably formed as unitary structures with the other components of the grid structure 10 using a molding process as discussed below. The flanges 32, 34 present on the respective upper or lower surfaces of the walls and first and second grid members 22 and 24 forming the small frames 25 preferably extend inwardly within the openings 26 less than about 0.25 inch (about 6.35 mm). More preferably, the flanges 32 and 34 extend horizontally from the generally vertical first and second grid members or peripheral walls about 0.125 inch (about 3.18 mm) on all sides within the grid. The nibs can be of any desired shape or configuration. In the presently preferred embodiment, the nibs 33 are in the form of cylinders, each having a diameter of about 0.0625 inch to about 0.125 inch (about 1.59 mm to about 3.18 mm), and a height above the upper surface 28 of the upper flanges 32 of about 0.0625 inch to about 0.125 inch (about 1.59 mm to about 3.18 mm). All of these exemplary dimensions are based upon the equally exemplary dimensions of the thickness of grid members 22 and 24 and of the peripheral walls, of about 0.065 inch (about 1.65 mm). The dimensions of the flanges 32 and 34, of the nibs 33 and of the thickness of the grid members and peripheral walls may be more or less without departing from the scope and spirit of the invention.

As shown best in FIG. 7, a plurality of grids 10a, 10b and 10c are releaseably attached to one another by interconnecting attachment elements 36 and interconnecting attachment elements 42 to form a grid assembly. FIG. 7, by way of example, shows three grids 10a, 10b and 10c interconnected to form a grid assembly. It is, however, within the spirit and scope of this invention that any number of grids may be interconnected to one another to form any size grid assembly and to provide a walking platform or support surface for a trickling filter, an air conditioning or other substrate surface where a flat platform or support surface is desired.

Referring to FIGS. 1 through 7, first embodiments of attachment elements 36 and 42 are provided on the outer surfaces of any one or more peripheral walls 14, 16, 18 and/or 20 of the frame 12. One of several sets of interconnecting attachment elements 36 may be in the form of tab connectors. Each tab connector 36 includes a projection 38 that extends from the upper exterior surface of a wall 14, 16, 18 or 20 of frame 12 of one grid, such as grid 10b (FIG. 2). Preferably, the projections 38 are formed as unitary structures with the rest of the grid structure components. Each projection 38 fits within a receiving slot 40 formed in a complementary location in an adjoining grid, such as grid 10a (FIG. 2). The projection 38, depicted as a rectangular projection, is slightly smaller than the receiving slot 40 and is illustrated in several locations in FIGS. 1–4, 6 and 7. The projection 38 of the tab connector 36 rests on the surface of the wall into which the slot 40 is formed. The tab connectors 36 provide alignment and connecting support to the interconnected grids.

A plurality of attachment elements 42, each in the form of a bayonet connector, are also formed, preferably as unitary structures with the rest of the grid structure components, on one or more peripheral walls 14, 16, 18 or 20. The bayonet connector 42 is best shown in FIGS. 1 and 2 as including a head or hook plate 44 extending from a connecting stem 46 projecting from a peripheral wall (e.g., wall 16 in FIGS. 1 and 2). The head 44 of the bayonet connector 42 of one grid, such as grid 10b (FIG. 2), is received by a receiving opening 48 provided in a wall of an adjacent grid 10a (shown in FIG. 2) at a location complementary to where the bayonet connector 42 is located on a wall of the first grid 10b. FIG. 5 shows the bayonet connector 42 including a head 44 and a stem 46 or grid 10b. The stem 46 fits within the receiving opening 48 of the adjacent wall 20 of the adjacent grid 10a to releaseably but securely connect the grid 10b to the adjacent grid 10a as shown in FIGS. 2, 5 and 7.

FIG. 7 shows, as an example, two sets of the projecting parts of the attachment elements in the form of two rectangular projecting members 38 of tab connectors 36 and two attachment elements in the form of bayonet connectors 42 on each of adjacent walls 14, 16 of grid 10a. It is within the scope and spirit of the invention that any number of attachment elements 36 and 42 could be used.

FIGS. 10–13 show second, presently preferred embodiments of attachment elements 136 and 142 which may be interconnected with any one or more of peripheral walls 14, 16, 18 and/or 20 of the frame 12. For clarity of illustration, the attachment elements 136 and 142 are shown as interconnecting the wall 6 of grid structure 10b and the wall 20 of adjacent grid structure 10a, in a grid assembly such as that illustrated in FIG. 7.

One of several sets of interconnecting attachment elements 136 may be in the form of a tab connector or locking clasp. Each tab connector 136 includes an angled projection 138 that extends from the lower exterior surface of a wall 14, 16, 18 or 20 of frame 12 of one grid, such as wall 16 of grid 10b. Preferably, the projections 138 are formed as unitary structures with the rest of the grid structure components, including the wall 16, which may have slots 139 extending upwardly from the lower surface 30 of the grid. The slots provide the angled projection 138 with more spring-like resilience of movement within the wall 16 to make interconnection easier to achieve and provide a more positive interlock. Each projection 138 fits within a rectangular receiving slot 140 formed in a complementary location and extending from the lower surface 30 of an adjacent wall 20 of an adjoining grid, such as grid 10a. The projection 138 has a slightly smaller width and height than those of the receiving slot 140. The projection 138 of the tab connector 136 interlocks with the interior upper surface of the slot 140 to prevent the grid 10b from being lifted and separated from the grid 10a unless the projection 138 is pressed toward the center of the grid 10b to release the projection 138 from the slot 140. The tab connectors 136 thus provide alignment and interlocking support to the interconnected grids.

A plurality of attachment elements 142, each in the form of a bayonet connector, are also formed, preferably as unitary structures with the rest of the grid structure components, on one or more peripheral walls 14, 16, 18 or 20. The bayonet connector 142 is best shown in FIGS. 10–13 as including a head or hook plate 144 extending from a connecting stem 146 projecting from the upper edge of a peripheral wall (e.g., wall 16 of grid 10b). The head 144 of the bayonet connector 142 of one grid, such as grid 10b, is received by a receiving opening 148 provided in the upper portion of a wall, such as wall 20, of an adjacent grid 10a at a location complementary to where the bayonet connector 142 is located on a wall of the first grid 10b. The connecting stem 146 fits within the receiving opening 148 of the adjacent wall 20 of the adjacent grid 10a to releaseably but securely connect the grid 10b to the adjacent grid 10a. The head 144 preferably has an angled lower edge 145 to make alignment and connection of the bayonet connector 142 of one grid with the receiving opening 148 of the adjacent grid. Likewise, the receiving slot 148 preferably has outwardly angled upper portions 149 to ease such alignment and interconnection of the two grids.

FIG. 7 shows, as an example, two sets of the projecting parts of the attachment elements in the form of two rectangular projecting members 38 of tab connectors 36 and two attachment elements in the form of bayonet connectors 42 on each of adjacent walls 14, 16 of grid 10a. It is within the scope and spirit of the invention that any number of attachment elements 36 and 42 or presently preferred attachment elements 136 and 142 could be used.

In addition, it would be understood by those of ordinary skill in the art in view of this disclosure that the present invention is not limited to the attachment elements being tab connectors 36 or 136 and/or bayonet connectors 42 or 142, and that alternative unitary or separable attachment members such as hinges, clips and the like could be used without departing from the spirit and scope of the invention.

In addition, FIG. 7 shows as an example, two sets of the receiving parts of the attachment elements 36 and 42, respectively in the form of receiving slots 40 and receiving openings 48, located in each of two adjacent walls (the third wall 18 and the fourth wall 20) of the grid 10a. The receiving slots 40 and openings 48 of grid 10a receive extending members 38 and bayonet connectors 42 of adjacent grids 10b and 10c that are to be connected to the first grid 10a. Thus, in this embodiment, each of adjacent walls 14 and 16 includes two sets of projecting connectors, preferably formed as unitary structures with the walls, and each of the other two adjacent walls 18 and 20 contains two sets of receiving slots or openings to be aligned with and shaped complementary to receive the projections on adjacent grids in an interlocking relationship. It is presently preferred that attachment elements 136 and 142 be used in place of the attachment elements 36 and 42 illustrated in FIGS. 1–7. It is within the scope and spirit of the present invention that any one or all of the walls have at least one projecting attachment element and that at least one other wall be provided with a receiving slot or opening.

The individual grid structures 10 are preferably made as unitary structures using an injection molding process comprising another aspect of this invention. Referring to FIGS. 8 and 9, an injection mold 50 includes two mold sections 52, 54 having the desired configuration including cavities generally designated as 56. The molding cavities are formed in the mold sections 52 and 54 in a conventional manner, using the appropriate tooling, machining or casting techniques well known to those skilled in the art. Such mold-making techniques do not form a part of the present invention. The mold sections are made to produce the grid structure 10, preferably including the attachment elements 36 and 42 or 136 and 142 as described above. To make the appropriate mold cavities, however, one skilled in the art would have to be made aware of the need to form the flanges 32 and 34 on at least a portion of the respective upper and lower surfaces 28 and 30 of the grid structure, as described above.

Thus, the mold sections include complementary wall cavity sections 58 which form the peripheral walls 14, 16, 18 and 20. The mold sections also include complementary first grid member cavity sections 60, forming grid members 22, as well as complementary second grid member cavity sections 62, forming grid members 24. The first mold section 52 include portions 64 shaped to form, together with cavity 64a of the second mold section 54, first flanges that, in use, become the upper flanges 32 for the grid structure 10. The cavity 64a of the second mold section also preferably includes a number of smaller cavities 64b to form nibs or projections 33 when the grid structure 10 is intended to be used as a walking platform, as described above. The second mold section 56 includes portions 66 shaped in a manner to produce, together with cavity 66a of the first mold section 52, second flanges that, in use, form lower flanges 34 for the grid structure 10. The second mold section 54 includes cavities 68 for forming the rectangular extending or projecting members 38 of interconnecting tab connectors 36. There are also cavities and shaped sections 70 formed on the mold sections that are adapted to form the bayonet connectors 42.

A liquid molten plastic or liquid curable polymeric material is filled within the cavities 56 of the mold sections 52, 54. The injected liquid material includes but is not limited to various liquid types of plastic that will have the desired structural requirements when hardened or cured. The presently preferred material used to make the grid structure 10 is UV light-stabilized polypropylene, which, when the molding process is completed and the grid is removed from the mold, will result in a rigid grid having the physical properties noted in Table 1 below.

After an appropriate time has elapsed for solidification or curing, the mold sections 52, 54 are separated and a rigid grid structure 10 of the type described above is removed from the mold.

TABLE 1

| PROPERTY | ASTM TEST METHOD | UNIT | MAGNITUDE |
| --- | --- | --- | --- |
| Specific Gravity | D1505-60T | gm/cu.cm | 0.905–0.91 |
| Hardness | D785-60T | Rockwell | R-78 |
| Flexural Stiffness | D747-58T | psi (73° F.) (22.8° C.) | 175,000 |
| Softening Point | D1525-58T | ° F. (° C.) | 266–293° F. (130–145° C.) |
| Impact Strength (Izod Notched) | D256-56 | 73° F. ft.-lbs./in. of notch | 3.8 |
| Heat distortion | D648-56 | ° F. (° C.) (66 psi Fiber stress) | 225° F. (107° C.) |
| Water Absorption | D570-59aT | % in 24 hrs. | <0.01 |

Based on a grid having dimensions of about 24 inches by about 24 inches, (about 610 mm by about 610 mm), a height of about 1.25 inches (about 31 mm), small frames of about 2 inches by about 2 inches (about 51 mm by about 51 mm) and grid members and peripheral wall thicknesses of about 0.065 inch (about 1.65 mm), each grid of the presently preferred embodiment weighs about 1.7 pounds (about 0.77 kg).

The grid structure 10 of the present invention and grid assemblies made using two or more interconnected grid structures provide an acceptable platform or support surface for the preferred use as a support platform for maintenance and repair of media-bearing systems, such as trickling filter systems and evaporative heat exchange systems.

It will be appreciated by those skilled in the art in view of this disclosure that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A unitarily-formed grid structure capable of withstanding a compressive force comprising a peripheral frame, a plurality of first grid members connected to and extending within the peripheral frame, a plurality of second grid members connected to and extending within the peripheral frame, the second grid members intersecting the first grid members, wherein the first and second grid members form a grid of small frames disposed within the peripheral frame, the grid having an upper surface and a lower surface and wherein a first group of at least a portion of at least one of the first and second grid members have flanges on the upper surface, the flanges extending in a direction generally perpendicularly to and only from one side of the first and second grid members and a second group of at least a portion of at least one of the first and second grid members have flanges on the lower surface, the flanges extending in a direction generally perpendicularly to the first and second grid members, the flanges on the lower surface extending only from a side opposed to the side from which the flanges on the upper surface extend.

2. A grid structure according to claim 1 wherein the peripheral frame includes a plurality of walls joined at corners to form a polygonal shape.

3. A grid structure according to claim 2 wherein the polygonal shape is generally rectangular.

4. A grid structure according to claim 2 wherein the polygonal shape is generally square.

5. A grid structure according to claim 1 wherein the first grid members are generally parallel to each other.

6. A grid structure according to claim 1 wherein the second grid members are generally parallel to each other.

7. A grid structure according to claim 1 wherein the first grid members are generally parallel to each other and the second grid members are generally parallel to each other.

8. A grid structure according to claim 4 wherein the small frames of the grid are generally in the shape of squares.

9. A grid structure according to claim 1 wherein the upper surface flanges on the first group of grid members comprise about one-third to about one-half of the upper surface of the grid.

10. A grid structure according to claim 1 wherein the lower surface flanges on the second group of grid members comprise about one-third to about one- half of the lower surface of the grid.

11. A grid structure according to claim 1 wherein the upper surface flanges on the first group of grid members comprise about one-third to about one-half of the upper surface of the grid and wherein the lower surface flanges on the second group of grid members comprise about one-third to about one-half of the lower surface of the grid.

12. A grid structure according to claim 1 wherein the upper surface flanges on the first group of grid members are formed on a portion of each of the first and second grid members and comprise about one-third to about one-half of the upper surface of the grid and wherein the lower surface flanges on the second group of grid members comprise about one-third to about one-half of the lower surface of the grid.

13. A grid structure according to claim 1 wherein the upper surface flanges on the first group of grid members comprise about one-half of the upper surface of the grid.

14. A grid structure according to claim 1 wherein the lower surface flanges on the second group of grid members comprise about one-half of the lower surface of the grid.

15. A grid structure according to claim 1 wherein the upper surface flanges on the first group of grid members comprise about one-half of the upper surface of the grid and wherein the lower surface flanges on the second group of grid members comprise about one-half of the lower surface of the grid.

16. A grid structure according to claim 1 wherein the upper surface flanges on the first group of grid members are formed on a portion of each of the first and second grid members and comprise about one-half of the upper surface of the grid and wherein the lower surface flanges on the second group of grid members are formed on a portion of each of the first and second grid members and comprise about one-half of the lower surface of the grid.

17. A grid structure according to claim 16 wherein the upper surface flanges on the first group of grid members comprise flanges extending around and within the upper surface of about one-half of the members forming the small frames in a first pattern and wherein the lower surface flanges on the second group of grid members comprise flanges extending around and within the lower surface of about one-half of the members forming the small frames in a second pattern, and further wherein first and second patterns are arranged such that a small frame of the first group of the first pattern is adjacent to a small frame of the second group of the second pattern.

18. A grid structure according to claim 1 further comprising attachment elements on the peripheral frame, the attachment elements being adapted to connect one grid structure to another grid structure.

19. A grid structure according to claim 18 wherein at least one of the attachment elements comprises a bayonet connector projecting from the peripheral frame adapted to connect with a receiving opening in a complementary location on the peripheral frame of another grid structure.

20. A grid structure according to claim 19 wherein at least one of the attachment elements comprises a projection from the peripheral frame adapted to mate with a receiving slot in a complementary location on the peripheral frame of another grid structure.

21. A grid structure according to claim 2 further comprising attachment elements on the walls of the peripheral frame, the attachment elements being adapted to connect one grid structure to another grid structure.

22. A grid structure according to claim 21 wherein at least one of the attachment elements comprises a bayonet connector projecting from at least one wall of the peripheral frame adapted to connect with a receiving opening in a complementary location on at least one wall of the peripheral frame of another grid structure.

23. A grid structure according to claim 22 wherein at least one of the attachment elements comprises a projection from the wall of the peripheral frame adapted to mate with a receiving slot in a complementary location on at least one wall of the peripheral frame of another grid structure.

24. A grid assembly comprising a plurality of grid structures according to claim 1.

25. A process of making a unitarily-formed grid structure capable of withstanding a compressive force comprising:

(a) forming a first mold section and a second mold section, the first and second mold sections together including a plurality of cavities adapted to form a grid structure comprising a peripheral frame, a plurality of first grid members unitarily formed with and extending within the peripheral frame, a plurality of second grid members unitarily formed with and extending within the peripheral frame, the second grid members intersecting the first grid members, wherein the first and second grid members form a grid of small frames disposed within the peripheral frame, the grid having a first surface and a second surface and wherein the first mold section has a shape that is adapted to form flanges on the first surface of a first group of at least a portion of at least one of the first and second grid members, the flanges extending in a direction generally perpendicularly to and only from one side of the first and second grid members, and wherein the second mold section has shape that is adapted to form flanges on the second surface of the second group of at least a portion of at least one of the first and second grid members, the flanges extending in a direction generally perpendicularly to the first and second grid members the flanges on the second surface extending only from a side opposed to the side from which the flanges on the first surface extend;

(b) bringing together and aligning the two mold sections;

(c) injecting into the cavities of the first and second mold sections a liquid material selected from the group consisting of a molten plastic material and a curable plastic material;

(d) allowing the liquid material to solidify or cure in the mold to form a solid grid structure;

(e) separating the mold sections; and (f) removing the solid grid structure.

26. A process for manufacturing a grid structure according to claim 25, further comprising configuring the first and second mold sections to form attachment elements for the peripheral frame of the grid structure, the attachment elements being adapted to connect one grid structure to another.

* * * * *